United States Patent [19]
Bretl et al.

[11] Patent Number: 4,486,782
[45] Date of Patent: Dec. 4, 1984

[54] FREQUENCY STABILIZATION OF A VCO FM MODULATOR

[75] Inventors: Wayne E. Bretl, Schaumburg; Victor G. Mycynek, Des Plaines, both of Ill.

[73] Assignee: Zenith Electronics Corporation, Glenview, Ill.

[21] Appl. No.: 385,635

[22] Filed: Jun. 7, 1982

[51] Int. Cl.³ .............................................. H04N 5/62
[52] U.S. Cl. ...................................... 358/197; 332/19
[58] Field of Search ..................... 358/121, 195.1, 197; 455/205, 214, 264; 332/18, 19; 331/14

[56] References Cited

U.S. PATENT DOCUMENTS

| 4,006,429 | 2/1977 | Talbot | 332/19 |
| 4,145,717 | 3/1979 | Guif et al. | 358/121 |
| 4,242,649 | 12/1980 | Washburn, Jr. | 332/19 |
| 4,322,751 | 3/1982 | Hongu et al. | 358/197 |

Primary Examiner—John C. Martin
Assistant Examiner—Michael D. Parker

[57] ABSTRACT

A system and method for stabilizing a voltage controlled oscillator (VCO) in an FM modulator is disclosed. The frequencies of a reference carrier and the VCO are sequentially detected in the same frequency discriminator, sampled and stored for later comparison in generating an error signal representing the average frequency difference between these two signals. This error signal is then summed with detected audio information and provided to the VCO as a correction signal for matching the VCO's frequency with the reference of the carrier. VCO signal instabilities due to system drift are thus eliminated for improved signal processing. A time-based switching approach is utilized for sequentially detecting and sampling the reference carrier and the VCO output. One embodiment of the invention utilizes AC coupling in the correction signal feedback loop eliminating DC signal drift and improving system operating stability. The present invention is particularly adapted for operation in a signal decoder such as utilized in a frequency modulated subscription television system wherein the audio carrier is processed and provided to a conventional television receiver.

10 Claims, 13 Drawing Figures

"A" MODULATION
"B" MODULATION
AMPLIFIED

REDUCED MODULATION.

−0V

0V

"B" MODULATION

−0V

FREQUENCY STABILIZATION OF A VCO FM MODULATOR

BACKGROUND OF THE INVENTION

This invention generally relates to the frequency modulation of a carrier signal and more particularly is directed to an improved system and method for generating a stabilized frequency modulated carrier signal.

Television signal transmission involves the amplitude modulation of one carrier for video transmission and frequency modulation of a second carrier for audio transmission. The audio carrier signal is 4.5 MHz above the video carrier which, in turn, is 1.25 MHz above a lower boundary of a particular channel. Each channel is 6 MHz in width.

Subscription television (STV) systems, which involve the transmission of encoded video and audio carriers with subcarrier signals and their decoding at a receiving site, are becoming increasingly popular and more numerous. Generally, the decoded video and audio signals are remodulated on an RF channel frequency, typically in the VHF spectrum such as channels 3, 4 or 6.

In general, the audio carrier, which is transmitted by the STV system to the STV decoder at a reference frequency, is detected by means of a discriminator circuit which provides an output signal made up of a first audio signal along with an FM subcarrier. The FM subcarrier is applied to a second discriminator which provides a second audio signal. The second audio signal usually represents the desired audio, but the decoder has the facility to switch in any combination of the first or second audio signal to the input of the VCO. The output of the VCO provides the new unscrambled sound carrier to be added to the unscrambled video for modulation to the desired unused channel.

Television receiver performance is degraded if the remodulated audio carrier is not centered on the discriminator characteristic of the television receiver's audio detector. Thus, prior art attempts to improve audio performance in the television receiver have centered on improving the frequency stability of the audio carrier provided to the television receiver. An example of an STV system for recovering the audio carrier in which the various signals are separated by filtering and then recombined by signal multiplication is provided in U.S. Pat. No. 4,145,717 to Guif et al. Another approach has been to utilize a stable local reference frequency to which the generated audio carrier is compared for providing a stable signal to the television receiver. This approach unfortunately requires the use of an expensive crystal oscillator for generating the reference frequency.

Other techniques involving phase locked loops to stabilize the average frequency of the generated audio carrier often require frequency dividers in addition to the local stable crystal reference oscillator. This is necessary because phase lock can only reliably occur if the phase deviation of the signals to be phase locked are reduced to less than 360°. A rather inexpensive circuit that can be used to generate an FM signal uses a VCO with LC elements for determining the center frequency. Unfortunately, these circuits have temperature drifts which result in frequency shifts that are much greater than those acceptable in TV sound modulation circuits. Attempts to stabilize such an oscillator by simple negative feedback from a frequency discriminator only result in shifting the burden of stability to the discriminator. The discriminator then is required to use expensive means for stabilization, and the overall expense and complexity of the system is increased.

In the present invention frequency drift and instability in the discriminator is eliminated by sequentially processing the reference frequency and the voltage controlled oscillator frequency to be stabilized through the same discriminator. Subsequent processing of these signals removes common mode frequency drift and instability while the difference in these average frequencies is measured and compensated for.

OBJECTS OF THE INVENTION

Accordingly, it is an object of the present invention to provide an improved means and method for generating a stabilized frequency modulated carrier signal.

It is another object of the present invention to stabilize a voltage controlled oscillator signal in a frequency modulation system.

Still another object of the present invention is to provide an improved subscription television decoder.

A further object of the present invention is to provide a more stable audio carrier signal for use in a subscription television system.

A still further object of the present invention is to regulate the voltage controlled oscillator in a frequency modulation system wherein voltage controlled oscillator stability is controlled by a received reference signal.

BRIEF DESCRIPTION OF THE DRAWINGS

The appended claims set forth those novel features believed characteristic of the invention. However, the invention itself as well as further objects and advantages thereof will best be understood by reference to the following detailed description of a preferred embodiment taken in conjunction with the accompanying drawings, where like reference numerals identify like elements in the several drawings, in which:

DESCRIPTION OF THE PREFERRED EMBODIMENTS

Figure 1:
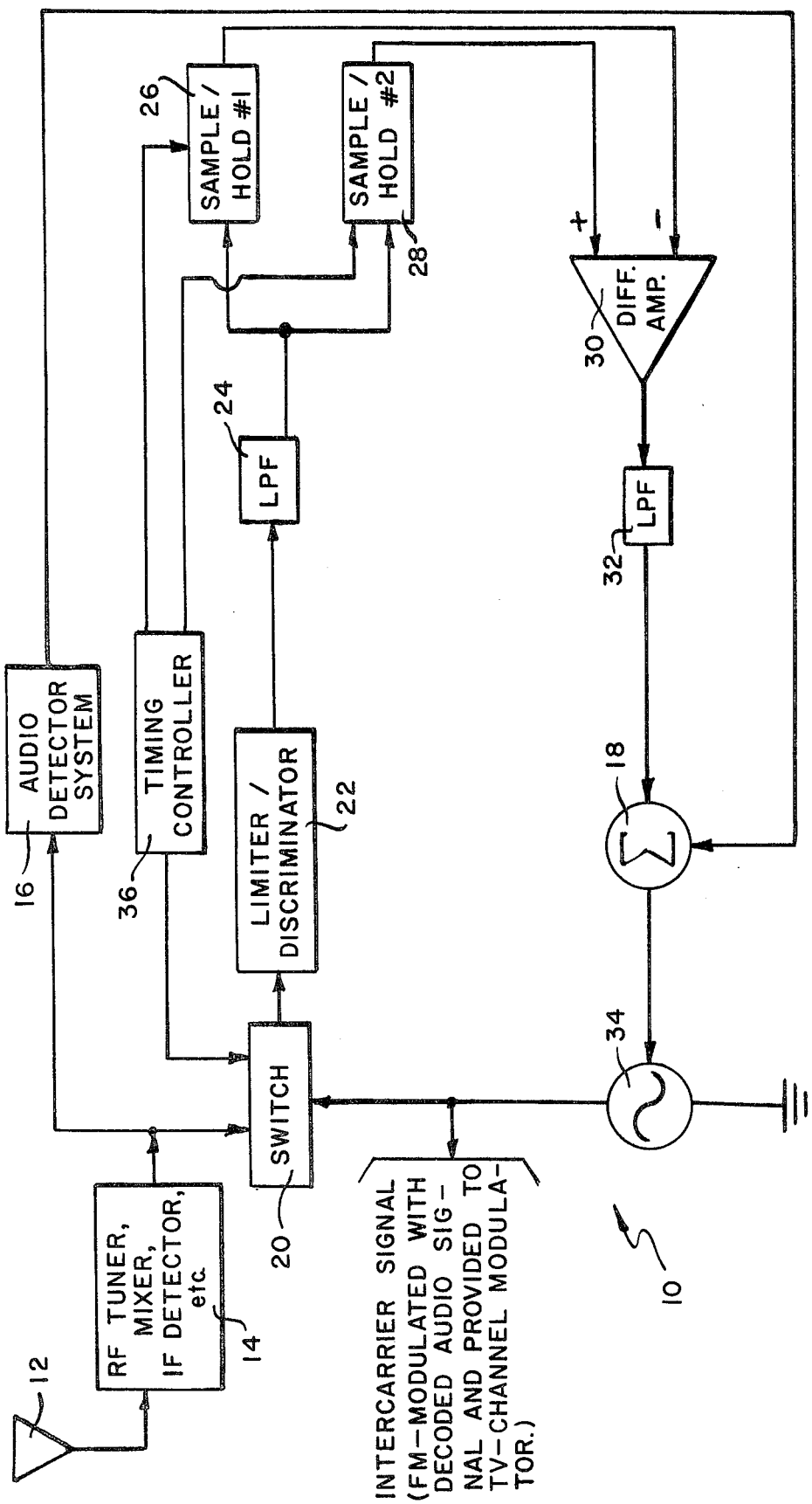
FIG. 1 is a simplified block diagram of a system for stabilizing the frequency of a voltage controlled oscillator (VCO) FM modulator in accordance with one embodiment of the present invention.

Referring to FIG. 1, there is shown in simplified block diagram form a system for stabilizing the frequency of a voltage controlled oscillator (VCO) in a frequency modulator 10. The present invention will be described as used in a subscription television (STV) system for providing a stabilized audio carrier signal to a conventional television receiver for processing therein. However, it is to be noted that the present invention is not limited to utilization in an STV decoding system, but has application in the frequency stabilization of any controlled oscillator to that of a given reference oscillator.

The transmitted signal which includes both video and audio carriers upon which are respectively amplitude and frequency modulated the transmitted video and audio information is received by an antenna 12 and provided to the front end circuitry 14 of a conventional RF receiver. Receiver front end circuitry 14 typically includes an RF amplifier and tuner, a mixer stage, and an intermediate frequency (IF) amplifier and detector. Also included in an STV receiving system is a signal decoder for decoding the transmitted signal in combination with RF circuitry for modulating the decoded video and audio signals to a predetermined unused VHF channel. Since an STV decoder is not part of the present invention, it is not shown in FIG. 1. However, the frequency stabilization system of the present invention could easily be incorporated in an STV decoder by conventional means. The output of the STV decoder includes the video and audio carriers. Since the processing of the video carrier is not a part of the present invention, it will not be further considered herein, as only the processing of the audio carrier, which is heterodyned to an intercarrier frequency of 4.5 MHz, is involved in the present invention.

The reference audio intercarrier is provided by the RF receiver front end 14 to a switch 20 and an audio detector system 16. The audio detector system 16 removes the frequency modulated audio information from the intercarrier signal in a conventional manner. The output of the audio detector system 16 will be either STV program audio when STV programming is received or a "barker" audio signal when the STV system is not in service or is not desired.

The intercarrier signal, which in the present invention is transmitted and received at a reference frequency of 4.5 MHz, is provided to a switch 20. Switch 20 includes three input ports, two of which are provided with the intercarrier signal from the receiver front end circuitry 14 and the output of a voltage controlled oscillator (VCO) 34, respectively. The third input to the switch 20 is provided by a timing controller 36 and determines which of the aforementioned input signals is to be provided to the limiter/discriminator 22 via the switch 20. Thus, timing controller 36 provides for the time-based sequential input of the received intercarrier and VCO signals to limiter/discriminator 22. Switch 20 can take the form of any conventional switching means for processing two separate signals. For example, a CMOS transistorized switch assembly could be utilized with the time-based control switch input provided by the timing controller 36. Switching may be performed at virtually any rate, e.g., approximately 1 Hz, provided that system settling time is accommodated to permit detection and measurement of the average frequencies of the VCO and audio intercarrier signals. The present invention contemplates the use of any conventional time-based switching network.

The multiplexed output from switch 20 is provided to a limiter/discriminator circuit 22 which provides a direct voltage output having a value corresponding to the frequency of the input signal provided thereto. The limiter/discriminator circuit 22 is alternately provided with the FM modulated VCO signal and with the 4.5 MHz reference intercarrier with FM modulation thereon. These two inputs to switch 20 alternate at the output of switch 20 at a rate determined by the control signals provided by timing controller 36 to switch 20. The multiplexed output signals from the limiter/discriminator circuit 22 then pass through a low pass filter 24 for the removal of unwanted modulation such as caused by the presence of the "barker" audio signal. This results in two slowly varying DC voltage signals being sequentially and selectively provided to sample and hold circuits 26, 28. Thus, the reference frequency intercarrier signal may be stored in the first sample and hold circuit 26, while the VCO signal may be stored in the second sample and hold circuit 28.

The first and second sample and hold circuits 26, 28 are also coupled to and under the control of timing controller 36. The timed outputs from timing controller 36 to switch 20 are synchronized with the control inputs provided to the first and second sample and hold circuits 26, 28. Thus, when the reference frequency intercarrier is provided via switch 20 to the limiter/discriminator circuit 22, the first sample and hold circuit 26 is enabled for receiving and storing the slowly varying DC voltage representing the average of the reference intercarrier frequency. Similarly, when the VCO output is provided via switch 20 to the limiter/discriminator circuit 22, timing controller 36 enables the second sample and hold circuit 28 to receive and store a DC voltage representing the average frequency thereof.

The respective outputs of the first and second sample and hold circuits 26, 28 representing the average frequencies of the reference intercarrier and VCO signals are provided to respective positive and negative input terminals of a differential amplifier 30. In response to the inputs provided thereto, differential amplifier 30 provides either a positive or a negative DC output depending upon the relative magnitudes of the two inputs provided thereto. The value of the DC output from differential amplifier 30 represents the difference in average frequency between the reference intercarrier and VCO signals. The DC output from differential amplifier 30 is provided to a low pass filter 32 for removing unwanted signal ripple caused by the switching action of the first and second sample and hold circuits 26, 28 which sequentially and repetitively receive respective inputs from low pass filter 24.

The filtered output signal from differential amplifier 30 is provided to signal summer 18 via low pass filter 32 as a DC voltage representing the average difference in frequency between the received reference intercarrier signal and the output of VCO 34. Also provided to signal summer 18 is the output from the audio detector system 16 which contains any audio information to be FM modulated on the VCO frequency. This audio information is summed with the DC output of differential amplifier 30 in signal adder 18 to form a control signal which is provided to VCO 34. VCO 34 is responsive to the voltage of an input signal provided thereto. Thus, the average frequency of the VCO output signal is controlled by the DC output of differential amplifier 30, thus completing a feedback loop which operates to reduce the difference in average frequency between VCO 34 and the reference intercarrier, while the instantaneous frequency of the VCO may be modulated by the audio signal provided by the audio detector system 16 to signal adder 18. The average output frequency of VCO 34 is thus stably controlled by the average frequency of the received intercarrier signal and may be provided to an RF channel modulator, and thence to the television receiver. The VCO output signal is also provided back to switch 20 for comparison with the received reference subcarrier signal as previously described.

Figure 2:
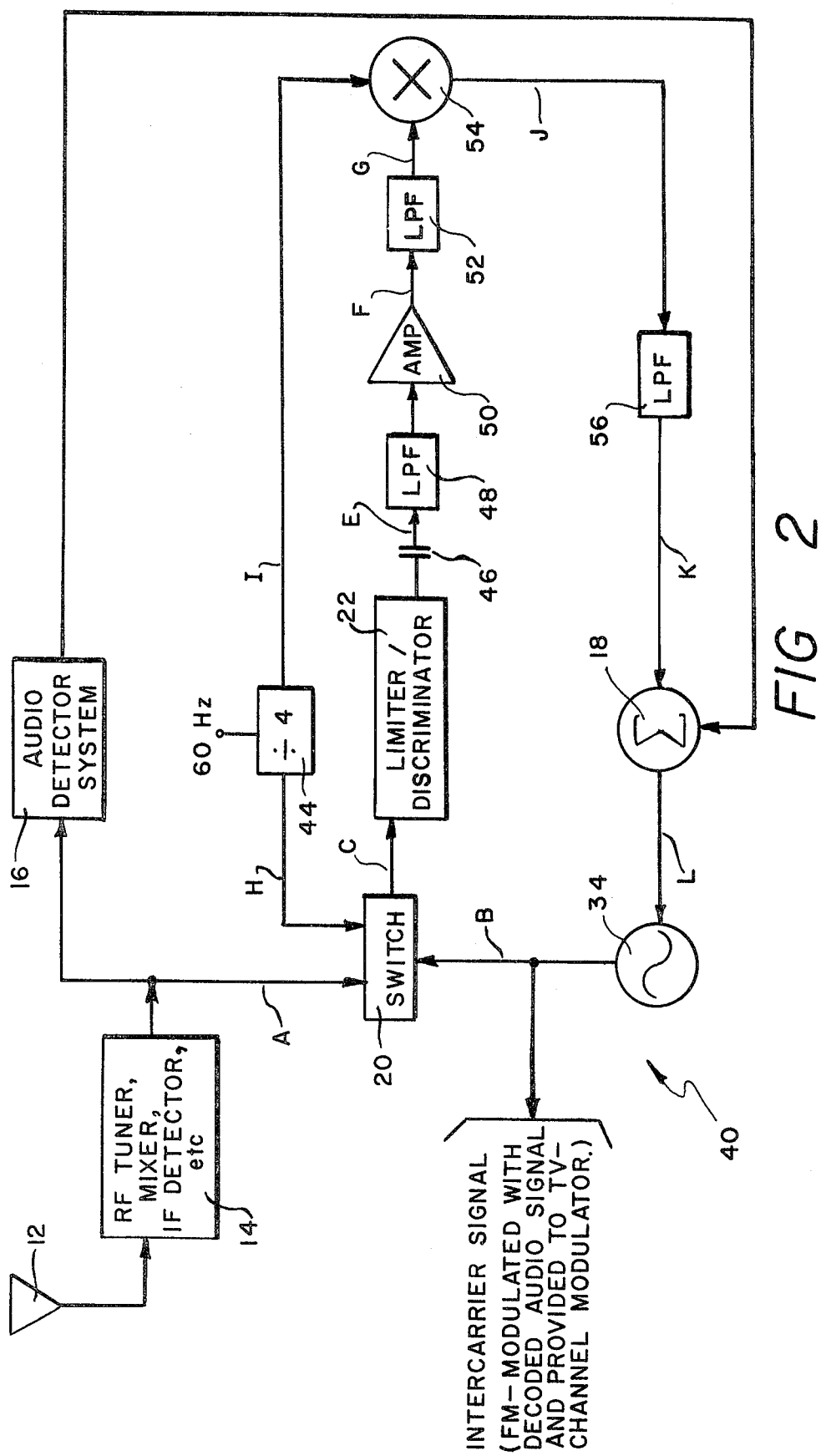
FIG. 2 is a simplified block diagram of a system for stabilizing the frequency of a VCO FM modulator in accordance with a second embodiment of the present invention.

Referring to FIG. 2, there is shown a second embodiment of a VCO frequency stabilization system for an FM modulator 40 in accordance with the present invention. The operation of the embodiment shown in FIG. 2 will be explained with reference to FIGS. 3A–3L. The letter designations of the various waveforms shown in the aforementioned figures correspond to the letter-designated locations of the system shown in FIG. 2. Identical reference characters have been used to identify like elements in FIGS. 1 and 2 where corresponding components perform identical functions in a similar manner.

Figure 3A:
FIGS. 3A through 3C and 3E through 3L show a set of waveforms representing the signals at various locations in the system shown in FIG. 2.
Figure 3B:
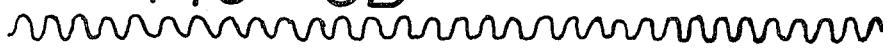

A transmitted signal is received by an antenna 12 and processed by the front end circuitry 14 of a conventional RF receiver. Front end circuitry 14 includes similar components as discussed with reference to FIG. 1. The frequency of the reference intercarrier (signal A) can be modulated by a first audio signal along with a subcarrier frequency which in turn can be modulated by a second audio signal. The VCO frequency also may be modulated. The object of this loop is to stabilize the average frequency of the VCO signal B to that of the reference intercarrier signal A, while maintaining the option of having audio modulation on either or both of the VCO and the reference intercarrier signals. Switch 20, which may be conventional in design as previously described, is controlled by a timed input from frequency divider 44. In a preferred embodiment, a conventional 60 Hz source is divided by 4 within frequency divider 44, with outputs provided to switch 20 and mixer 54. The input signals provided to switch 20 are thus alternately provided thereto from the RF receiver front end 14 and VCO 34 at a switching rate of 15 Hz. The respective inputs provided to switch 20 are shown in FIGS. 3A and 3B. Both signals may be frequency-modulated by audio information.

Figure 3C:

The output from switch 20 is provided to limiter/discriminator circuit 22 as shown in FIG. 3C. Limiter/discriminator 22 has a low Q value for providing linear operation therein particularly near the upper and lower frequency limits of the input signals provided thereto. Linear operation of this discriminator is important to assure equal treatment of all FM carrier sidebands. This makes the average output of the discriminator independent of signal related modulation. Because a large amount of amplification is desirable before further processing a feature of this preferred embodiment AC couples the signal through the high gain amplifier. The AC coupling negates the effects of DC drift in both the low Q discriminator and the high gain amplifier. DC drift can result from temperature effect changes in the tuned circuits of the discriminator 22 and from the electronic components contained within the discriminator and the high gain amplifier 50. The alternating portions of signal 3E represent in successive time periods the detected frequencies of signals A and B, respectively. During each of these time periods, the signal consists of a DC level representing average frequency, plus AC components representing FM modulation. The waveform 3E thus contains an AC component at the switching frequency, this component representing the difference between the average frequencies of signals A and B. This signal 3E may then be amplified by an AC-coupled amplifier.

Other advantages in signal processing result from the fact that some of the modulation that may be present on the output of limiter/discriminator 22 is filtered by low pass filter 48 before amplification by amplifier 50. This reduces the signal swing due to any audio modulation and provides an output F which is an accurate representation of the frequency difference between the intercarrier reference frequency and the VCO. Low pass filter 52 further reduces the audio modulation on the signal. A second function of the low pass filters 48 and 52 is to shift the phase of the switching frequency component of the output of the limiter/discriminator 22 by 90°. In this case the switching frequency is 15 Hz and the 90° required phase shift is distributed between the two low pass filters with a 45° shift provided by each. In a preferred embodiment, a differential peak detector is used for the limiter/discriminator circuit 22, although any conventional frequency discriminator having a linear performance characteristic could be utilized in the present invention.

Figure 3E:
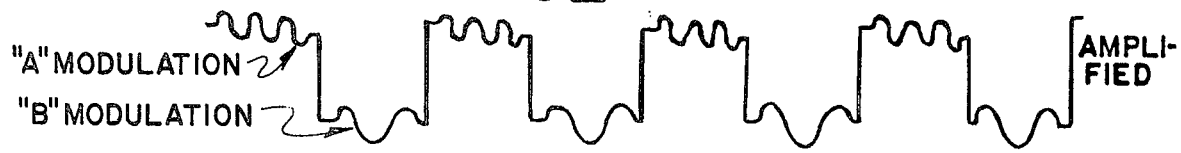
Figure 3F:
Figure 3G:
Figure 3H:
Figure 3I:

The AC-coupled input to low pass filter 48 is shown in FIG. 3E. This composite input signal modulated by the switching rate of switch 20 is shifted 45° by low pass filter 48 and provided to AC amplifier 50. The output of amplifier 50 is shown in FIG. 3F and is provided to low pass filter 52 where the signal is again shifted 45° in phase as shown in FIG. 3G and provided to mixer 54.

Figure 3J:

With the respective outputs H and I from frequency divider 44 shifted 90° with respect to one another and the switched outputs from limiter/discriminator circuit 22 shifted 90° by means of low pass filters 48, 52, mixer 54 operates as a synchronous detector for detecting the magnitude and the polarity of the signal G which is provided to synchronous detector 54. The average magnitude represents the difference between the average frequencies of the VCO and the reference intercarrier frequency. The polarity indicates whether the VCO average frequency is greater or less than the intercarrier reference frequency. For the case shown in FIGS. 3G, 3I, and 3J, signal G is 180° out of phase with respect to signal I. Thus the output of mixer 54, signal J, becomes a negative-going full wave rectified line wave as shown in FIG. 3J and provided to low pass filter 56. When signal G is in phase with signal I, a positive-going full wave rectified line wave results for signal J. By thus synchronously detecting the amplitude of waveform G and its phase with respect to waveform I, the relative average frequency of the VCO output signal with respect to the average frequency of the reference intercarrier signal may be detected and a signal representing the average frequency difference generated and provided to low pass filter 56. The H output from frequency divider circuit 44 thus provides a modulation function, while the I output from frequency divider circuit 44 performs a demodulation function.

Figure 3K:
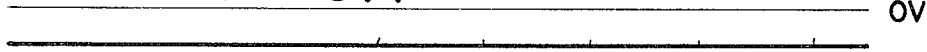
Figure 3L:
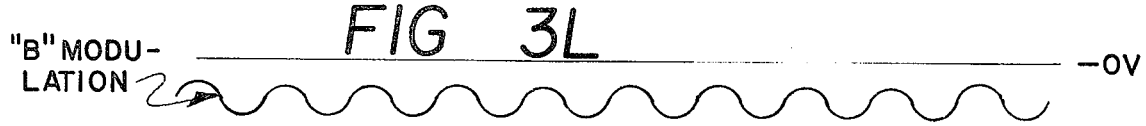

The output from synchronous detector (mixer) 54, which represents the difference in average frequency between the two signals provided thereto, is provided to low pass filter 56 for removal of the harmonics of the switching rate in signal 3J. A DC signal is thus provided to signal summer 18 as shown in FIG. 3K for addition with the recovered audio information provided by the audio detector system 16. The output from signal adder 18, shown in FIG. 3L, is provided to the VCO 34 for adjustment of the oscillating frequency thereof. Since the average frequency of VCO 34 is responsive only to the DC portion of the signal provided thereto, the DC signal provided from mixer 54 via low pass filter 56 to signal adder 18 completes a feedback loop which operates to reduce the difference between the VCO average frequency and that of the reference intercarrier signal. The frequency-stabilized output of VCO 34 is provided to the remainder of the RF receiver as previously explained with reference to FIG. 1 for processing therein and to switch 20 for maintaining frequency stabilization of the VCO with the received intercarrier signal. When stabilization has occurred, the AC components of waveform 3E at the switching rate are reduced to nearly zero amplitude.

There has thus been shown a means and method for stabilizing the frequency of a voltage controlled oscillator in a frequency modulating system by frequency stabilizing the voltage controlled oscillator to a received reference intercarrier frequency.

While particular embodiments of the present invention have been shown and described, it will be apparent to those skilled in the art that changes and modifications may be made therein without departing from the invention in its broader aspects. The aim in the appended claims, therefore, is to cover all such changes and modifications as fall within the true spirit and scope of the invention.

We claim:

1. In a signal decoder for processing received audio and video signals wherein audio information is received on a reference audio carrier, said signal decoder including detector means for separating the audio signal from said reference audio carrier and a voltage controlled oscillator for remodulating the audio signal, a system for stabilizing said voltage controlled oscillator comprising:
   switch means alternately coupled to said received reference audio carrier and said voltage controlled oscillator for generating a multiplexed output signal comprised of said reference audio carrier and said voltage controlled oscillator signal;
   discriminator means coupled for receiving said multiplexed output signal and responsive to the frequency thereof for alternately generating first and second DC voltage signals respectively representing the frequencies of said reference audio carrier and said voltage controlled oscillator signal;
   low-pass filter means coupled to said discriminator means for removing from said first and second DC voltage signals variations therein due to audio modulation in said system;
   first and second sample and hold circuits coupled to said low-pass filter means for respectively sampling said low-pass filtered first and second DC voltage signals;
   a differential amplifier comparing the outputs of said first and second sample and hold circuits for generating a correction signal representing a frequency difference between said reference audio carrier and said voltage controlled oscillator; and
   adding means coupled to said detector means and said differential amplifier for adding said correction signal to said detected audio signal for generating a control signal and for providing said control signal to said voltage controlled oscillator wherein the average frequency of said voltage controlled oscillator is adjusted so as to coincide with the average frequency of said reference audio carrier.

2. The system of claim 1 further including a timing controller coupled to said switch means and said first and second sample and hold circuits for selectively enabling said first sample and hold circuit in said system when the reference audio carrier is provided to said discriminator means via said switch means and for enabling said second sample and hold circuit in said system when the voltage controlled oscillator is coupled to said discriminator means via said switch means.

3. The system of claim 2 wherein said timing controller switches at a rate of approximately 1 Hz in sequentially coupling said multiplexed reference audio carrier and said voltage controlled oscillator signals to said discriminator means and for sequentially switching said first and second sample and hold circuits in and out of said system in synchronism therewith.

4. The system of claim 1 further including filter means coupling said differential amplifier and said adding means for removing transient variations in said correction signal in providing a stable control signal to said voltage controlled oscillator.

5. The system of claim 1 as used for decoding a received television signal wherein said reference audio carrier is at 4.5 MHz and further including a television channel modulator coupled to said voltage controlled oscillator for receiving the thus adjusted output therefrom.

6. In a signal decoder for processing received audio and video signals wherein audio information is received on a reference audio carrier, said signal decoder including detector means for separating the audio signal from said reference audio carrier and a voltage controlled oscillator for remodulating the audio signal, a system for stabilizing said voltage controlled oscillator comprising:
   discriminator means responsive to the frequency of an input signal for generating an output signal having a DC voltage proportional to the frequency of said input signal;
   switch means alternately coupled to said received reference audio carrier and said voltage controlled oscillator in generating a multiplexed output signal comprised of said reference audio carrier and said voltage controlled oscillator signal and coupled to said discriminator means for providing said multiplexed output signal thereto;
   comparing means switchably coupled to said discriminator means for sequentially receiving and comparing first and second DC voltage signals respectively representing the frequencies of said reference audio carrier and said voltage controlled oscillator signal and for generating a correction signal representing a frequency difference between said reference audio carrier and said voltage controlled oscillator;
   a low frequency signal source for generating low frequency switching signals and wherein said comparing means includes a signal mixer with said low frequency signal source coupled to said switch means and said signal mixer for synchronously providing said low frequency switching signals thereto; and
   adding means coupled to said detector means and said comparing means for adding said correction signal to said detected audio signal in generating a control signal and for providing said control signal to said voltage controlled oscillator wherein the average frequency of said voltage controlled oscillator is adjusted so as to coincide with the average frequency of said reference audio carrier.

7. The system of claim 6 wherein said reference audio carrier and said voltage controlled oscillator signal are modulated by said low frequency switching signal in said switching means and the switching signal provided to said signal mixer is shifted 90° in phase from the switching signal provided to said switch means, said system further including low pass filter means coupling said discriminator means and said signal mixer for filtering and shifting the multiplexed output of said discriminator means 90° in phase.

8. The system of claim 7 wherein said discriminator means and said signal mixer are AC coupled by means of a capacitor and AC amplifier combination for eliminating DC drift in said system.

9. The system of claim 7 wherein said signal mixer synchronously detects the amplitude and polarity of the switched first and second DC voltage signals output by said discriminator means in generating and providing said correction signal to said adding means.

10. The system of claim 7 wherein said low frequency signal source includes a 60 Hz AC source in combination with a frequency divider for providing said low frequency switching signal to said switch means and said signal mixer.

* * * * *